US008587916B2

(12) United States Patent
Yamakoshi et al.

(10) Patent No.: US 8,587,916 B2

(45) Date of Patent: Nov. 19, 2013

(54) LIGHTNING PROTECTION FASTENER, AIRCRAFT ASSEMBLY, AND METHOD OF MANUFACTURING AIRCRAFT ASSEMBLY COMPONENT

(75) Inventors: Hideo Yamakoshi, Tokyo (JP); Yuichiro Kamino, Tokyo (JP); Yuji Asahara, Tokyo (JP); Yasunori Watanabe, Tokyo (JP); Atsuhiro Iyomasa, Tokyo (JP); Toru Hashigami, Aichi (JP); Kohei Murakami, Aichi (JP); Tomonori Okumura, Aichi (JP)

(73) Assignee: Mitsubishi Aircraft Corporation, Aichi (JP)

(*) Notice: Subject to any disclaimer, the term of this patent is extended or adjusted under 35 U.S.C. 154(b) by 0 days.

(21) Appl. No.: 13/420,008

(22) Filed: Mar. 14, 2012

(65) Prior Publication Data

US 2012/0236457 A1 Sep. 20, 2012

(30) Foreign Application Priority Data

Mar. 16, 2011 (JP) .................................. 2011-58594

(51) Int. Cl.
*H05F 3/00* (2006.01)

(52) U.S. Cl.
USPC .......................................................... 361/218

(58) Field of Classification Search
USPC .......................................................... 361/218
See application file for complete search history.

(56) References Cited

U.S. PATENT DOCUMENTS

| | | | | |
|---|---|---|---|---|
| 2,611,285 | A * | 9/1952 | Gross | 403/288 |
| 2,643,904 | A * | 6/1953 | Wehmanen | 411/542 |
| 2,751,806 | A * | 6/1956 | Dickie | 411/542 |
| 2,798,444 | A * | 7/1957 | Meakin | 425/204 |
| 2,858,156 | A * | 10/1958 | Wootton | 277/642 |
| 2,986,244 | A * | 5/1961 | Hutchison | 220/693 |
| 3,087,370 | A * | 4/1963 | Iaia | 411/369 |
| 3,299,766 | A * | 1/1967 | Gould et al. | 411/371.1 |
| 4,295,766 | A * | 10/1981 | Shaw | 411/113 |
| 4,399,642 | A * | 8/1983 | Bard et al. | 52/483.1 |
| 7,936,550 | B2 * | 5/2011 | Morrill et al. | 361/218 |
| 2003/0234498 | A1 * | 12/2003 | Busby et al. | 277/651 |
| 2007/0258182 | A1 * | 11/2007 | Morrill et al. | 361/216 |
| 2010/0224724 | A1 * | 9/2010 | Kamino et al. | 244/1 A |
| 2010/0277849 | A1 * | 11/2010 | Morrill et al. | 361/218 |
| 2011/0226896 | A1 * | 9/2011 | Bessho et al. | 244/1 A |
| 2012/0236457 | A1 * | 9/2012 | Yamakoshi et al. | 361/218 |

FOREIGN PATENT DOCUMENTS

| | | | |
|---|---|---|---|
| JP | 02-007398 | A | 1/1990 |
| JP | 2010-2542887 | A | 11/2010 |

* cited by examiner

*Primary Examiner* — Ronald W Leja

(74) *Attorney, Agent, or Firm* — Pearne & Gordon LLP

(57) ABSTRACT

A long-life lightning protection fastener or the like to prevent explosion for aircrafts at low cost is provided, the fastener having a light weight, ensuring sufficient lightning protection, and having extremely less failures and high reliability. A ring-shaped ring member 40A made of resin is mounted on a collar 26. This ring member 40A is interposed between a member 22 and the collar 26 and is in intimate contact with both of the member 22 and the collar 26, thereby sealing an interface with the member 22 for sealing and preventing the occurrence of an arc at an outer perimeter edge of the collar 26.

10 Claims, 14 Drawing Sheets

LIGHTNING PROTECTION FASTENER, AIRCRAFT ASSEMBLY, AND METHOD OF MANUFACTURING AIRCRAFT ASSEMBLY COMPONENT

BACKGROUND OF THE INVENTION

1. Field of the Invention

The present invention relates to a lightning protection fastener to prevent explosion for use in a portion where there is a possibility of the presence of flammable fuel vapor, such as a fuel tank placed in an airframe of an aircraft, in particular, in a wing or a body thereof, and also relates to an aircraft assembly and a method of manufacturing aircraft assembly component.

2. Description of the Related Art

A wing partly constituting an airframe of an aircraft generally has a hollow structure. A wing-surface panel forming a wing surface is fixed to a structural member inside the wing with a fastener member (a fastener).

In this case, the fastener member fastens the wing-surface panel and the structural member together, with a pin-shaped fastener body being inserted from outside of the wing into through holes formed on both of the wing-surface panel and the structural member inside of the wing and its tip being fixed from inside of the wing with a fixing metal part.

Other than the above, in the inside of the wing and a body part, a structural member other than the wing-surface panel and a member for fixing equipment are also fastened or fixed with the fastener member (the fastener).

In this case, the fastener member fastens both members together, with a pin-shaped fastener body being inserted into both through holes formed on both of the members to be fixed together and its tip being fixed with a fixing metal part.

Note that the number of wing-surface panels or members to be fixed is not restricted to two.

Meanwhile, in an aircraft, it is required to fully assure lightning protection measures for preventing explosion. If lightning hits the aircraft and a large current flows through the wing-surface panel or a component member of a main wing or the like, part or an entirety in some cases of the current flows through these various fastening parts described above. If the current value exceeds a limit value of a passage allowable current at each fastening part, an electric discharge called an electric arc (or a thermal spark) occurs (hereinafter referred in the specification as an arc). This is a phenomenon in which a local part at a fastening interface between members mainly made of a conductive material configuring the fastening part has a occurrence of an abrupt increase in temperature due to a current passing through a fastening part, and is molten to cause an electric discharge into the air. In many cases, a molten substance called hot particles scatters from a molten portion. In general, the inner space of the wing is used also as a fuel tank. Therefore, it is required to prevent ignition by suppressing the occurrence of an arc or sealing an arc at the time of a hit by lightning, thereby preventing a discharge of the generated arc and hot particles scattered therefrom from being in contact with flammable fuel vapor, and such an explosion prevention structure is necessary (refer to "Lightning Protection of Aircraft", Second Edition by F. A. Fisher, J. A. Plumer, and R. A. Perala, 2004, Lightning Technologies Inc., p. 218, p. 266).

Specifically, as a lightning protection (explosion prevention) measure, it is required to take a measure of suppressing or sealing the occurrence of an electric arc as described at a portion having a possibility of being filled with flammable fuel vapor among interfaces between the fastener member (the fastener) and any of various members to be fastened thereby. Here, examples of the portion having a possibility of being filled with flammable fuel vapor include the inside of a fuel tank, the inside of a surge tank (a tank where a vent scoop, a burst disk, and others are placed) generally placed on a wing end side of the fuel tank, and the inside of fuel-system equipment, in a portion inside the wing and a body part.

To achieve the above, conventionally, a structure as shown in FIGS. 10A and 10B, for example, and as described below has been proposed. The structure is such that, a fastener member 4 penetrating through a first member 2 exemplified by a wing-surface panel and a second member 3 mounted onto the inside of the wing 1 has a fastener body 4*a* and a fixing metal part 4*b* and, inside a wing 1, a cap 6 is mounted away from these fastener body 4*a* and fixing metal part 4*b*, thereby forming a gap 7 filled with air between the fastener body 4*a* and the fixing metal part 4*b* (refer to Japanese Patent Application Laid-Open No. 2-7398).

However, in the technology described in Japanese Patent Application Laid-Open No. 2-7398, the structure is not such that the cap can be positioned with respect to the fastener member 4, and the mounting position of the cap 6 depends on an operator. Therefore, there is a possibility that the center of the cap 6 and the center of the fastener member 4 may be significantly shifted. If a space between the fastener member 4 and the cap 6 is small in the gap 7, the function (insulation) of the cap 6 is degraded. At worst, if the cap 6 is mounted as being in contact with the fastener member 4, the function of the cap 6 itself may be significantly degraded.

Moreover, the cap 6 may be mounted on the second member 3 with an adhesive 9 as shown in FIG. 10A, or may have its outer perimeter covered with a sealant (an insulating material) 10 as shown in FIG. 10B. Therefore, an adhering work or a work of applying the sealant 10 is required at a mounting site, thereby taking some work. Needless to say, the space inside the wing 1 of the aircraft is narrow, and workability of performing the work as described above at a deep position is extremely low. Furthermore, since several thousands to several tens of thousands of such fastener members 4 are provided to the entire wing 1, degradation in workability directly links to an increase in cost. Still further, sufficiently applying the sealant 10 tends to invite overweight. Other than the wing, portions having a possibility that flammable fuel vapor is present have a similar problem, although the number of fastener members 4 required in those portions is smaller than that in the wing.

Still further, the work as described above is carried out manually, and the quality of work tends to vary depending on the worker, which also influences reliability.

FIG. 11 shows an example of a general arc sealing method at a fastener part. An example of this type is also disclosed in "Lightning Protection of Aircraft", Second Edition by F. A. Fisher, J. A. Plumer, and R. A. Perala, 2004, Lightning Technologies Inc., p. 266, Fig. 7.47, Fastener sealing concepts. (b). A fastening portion of the fastener member 4 on a side where flammable fuel vapor is present (such as a fuel-tank side) is over-coated with the sealant 10, or a cap seal 5 (a cap with the sealant hardened in advance) is bonded to that portion with the sealant for placement. However, even in this example, a work of sealant coating is required, and there is a problem similar to that described above.

Still further, the sealant is exposed to a low-temperature environment, for example, at −60 degrees Celsius, during flight of the aircraft. In such an environment, there is a possibility that the sealant is hardened to degrade intimate contact capabilities. To provide a sufficient arc suppressing capability even in this state, it may be required to apply a sufficiently thick sealant, which poses a problem in weight.

Still further, due to revisions in aviation regulations to prevent explosion of fuel tanks, demands for preventing failures in these lightning protection (explosion prevention) measures have become extremely strict, and the occurrence of a failure in even one fastener among several thousands to several tens of thousands fasteners per aircraft cannot be permitted. Therefore, it is required for the lightning protection (explosion prevention) measures to prevent the occurrence of failures at the time of manufacture (manufacturing mistakes, mount mistakes, and inspection mistakes), to prevent a decrease in capabilities due to variations in manufacture, and to prevent deterioration in performance and others in an operating environment with an aircraft life of over thirty years, and ensuring reliability and guaranteeing quality as described above are strictly demanded. On the other hand, from economical and environmental demands, measures achieving low cost and light weight are demanded.

Thus, the inventors have already suggested a technology having a structure in which an engaging part is formed at a portion of a fastener member projecting inside of an airframe, an engaged part engaged with the engaging part of the fastener member is formed at a center part on an inner perimeter surface of a cap, and the engaging part of the fastener member is engaged with the engaged part (refer to Japanese Patent Application Laid-Open No. 2010-254287).

SUMMARY OF THE INVENTION

However, even in the technology described in Japanese Patent Application Laid-Open No. 2010-254287 as described above, it is required to fill the inside of the cap with a sealant in order to ensure insulation, thereby taking some work. Moreover, the sealant is required to be stored at low temperature before work, and its consumable period is short after the sealant is exposed to an environment at room temperature, which is a factor of increasing cost.

Furthermore, as described above, the sealant is exposed to a low-temperature environment, for example, at −60 degrees Celsius, during flight of the aircraft. In such an environment, there is a possibility that the sealant becomes at a temperature lower than its glass transition temperature to be hardened. Then, even with the technology described in Japanese Patent Application Laid-Open No. 2010-254287, although not as much as the technology disclosed in “Lightning Protection of Aircraft” described above, there is a possibility of an adverse effect in capability of suppressing the occurrence of an arc.

The present invention has been accomplished based on the technological problems described above, and has an object of providing a long-life lightning protection fastener to prevent explosion for an aircraft at low cost, the fastener having a light weight, ensuring sufficient lightning protection capability, and having extremely less failures and high reliability, and also providing an aircraft assembly and a method of manufacturing an aircraft assembly component.

With the object as described above, the inventors have diligently studied an arc occurring around the fastener member 4 by investigating arc occurrence positions in a lightning test and analyzing and measuring its current distribution and others. As a result, as shown in FIG. 11 in which a current flow and arc occurrence positions are depicted by way of example, an arc occurs a) between the wing panel 2 and the fastener member 4, b) between the wing panel 2 and the second member 3, c) at an interface between the second member 3 and an outer perimeter edge part 4*c* of the fastener member 4, d) between the fastener body 4*a* and an inner surface of a hole of the second member 3, and e) at a screw end part between an end 4*d* of the fastener body 4*a* and a collar 4*b*. In particular, a measure against an arc occurring c) at the interface between the second member 3 and the outer perimeter edge part 4*c* of the fastener member 4 has been found to be important in fastener lightning protection measures.

The reason for this is as follows. The position a) described above is outside the fuel tank (or a portion where flammable fuel vapor is not present), and therefore poses no problem. The position b) described above is important, but is a matter of a mating surface, and is not a matter of the fastener targeted by the present invention (in general, this portion is handled with a sealant). The problem occurring in the position d) described above can be solved if the sealing measures for the positions b) and c) described above are completed. An occurrence of an arc in the position e) described above is a phenomenon only occurring in special cases, such as a case in which a lightning current at a prescribed current value or higher is experimentally provided and the conduction state between members is extremely poor, and possibly never happening in practice.

Therefore, it is important to prevent the occurrence of an arc at the position c) or, in case of the occurrence, to seal the position c) so that a discharge of the arc and hot particles scattered therefrom are not in contact with flammable fuel vapor.

The present invention accomplished based on the findings as described above includes a fastener body provided in order to fasten at least two of members configuring an airframe of an aircraft, the fastener body penetrating from one side to another side through holes formed in all of the members, a fastening member mounted on the fastener body projecting to the other side of the members, and a ring member made of an insulating material, the ring member being interposed in a compressed state between at least one of an outer perimeter part of a head of the fastener body and an outer perimeter part of the fastening member, and the members when the fastener is fastened.

By interposing the insulating ring member in a compressed state between at least one of the outer perimeter part of the head of the fastener body and the outer perimeter part of the fastening member, and the members, a space where an electric discharge can occur near an interface between the head of the fastener body or the outer perimeter part of the fastening member, and the members is eliminated, and the occurrence of an arc at such a position as the position c) described above can be prevented. Also, even if an arc occurs, an electric discharge of the generated arc and hot particles flying therefrom can be prevented from being in contact with flammable fuel vapor.

The ring member fits in a groove formed on the outer perimeter part of the head of the fastener body or the outer perimeter part of the fastening member.

The groove may have a tapered surface with a diameter gradually reduced as being away from the members. With such configuration, the ring member is less prone to be detached from the groove.

Also, the groove may have a parallel surface parallel to the surfaces of the members, and the ring member may be interposed between the parallel surface and the surfaces of the members.

Furthermore, an edge part between an inner perimeter surface of the groove and an outer surface of the fastener body or the fastening member is preferably formed to have an obtuse angle.

Still further, at least one of the ring member and the groove may include means preventing the ring member from being detached from the groove.

A second ring member made of an insulating material may be further included, the second ring member being interposed in a compressed state between an inner perimeter part of the fastening member and the members.

When one of the two members is a fuel tank, a sealing material for preventing fuel from leaking from the one member to the other member may be applied onto at least one of an interface between the two members, an interface between the fastener body and the two members, and a portion between a tip of the fastener body and the fastening member.

On the other hand, if the ring member and the second ring member have a function of preventing fuel from leaking, application of the sealing material may be omitted.

The present invention can be directed to an aircraft assembly, wherein at least two of members configuring an airframe of an aircraft are fastened by the lightning protection fastener according to any one of the aspects mentioned above.

Note that while the present invention is a measure at the time of being hit by lightning, which is generally considered as the largest among currents flowing through a fastening part in the wing of the aircraft, the present invention has a similar effect also on a fault current from an electric system of the aircraft to the structure thereof where an arc due to current is problematic.

The present invention can be directed to a method of manufacturing an aircraft assembly requiring an explosion prevention measure by using the lightning protection fastener according to any one of the aspects mentioned above, the method including the steps of: placing at least two members as superposed; forming a fastener hole in the superposed at least two members so that the fastener hole penetrate therethrough; applying a sealant onto a contact surface between the two members, and placing again the at least two members as superposed while squeezing out the applied sealant to surroundings of the contact surface; inserting the fastener body into the fastener holes of the at least two members so that the faster body penetrates therethrough; and mounting and fastening a collar onto the fastener body, the collar having a ring made of an insulating material inserted in advance in a groove provided at an outer perimeter of a contact face with the members.

According to the present invention, with the insulating ring member being interposed in a compressed state between at least one of the outer perimeter part of the head of the fastener body and the outer perimeter part of the fastening member, and the members, an interface between the two members and the head of the fastener body and the fastening member can be sealed. Therefore, a high lightning protection (explosion prevention) capability at low cost and having a light weight and sufficient and extremely high reliability can be ensured. Furthermore, with the structure in which the ring member is securely interposed in a compressed state between the members and the fastener body, the ring member does not come off at the time of manufacturing or operation of the aircraft.

DETAILED DESCRIPTION OF THE PREFERRED EMBODIMENTS

The present invention is described in detail below based on embodiments shown in the accompanying drawings.

First Embodiment

FIGS. 1A to 1H are sectional views of part of a wing configuring an airframe of an aircraft to which a lightning protection fastener in a first embodiment described below is applied.

Figure 1A:
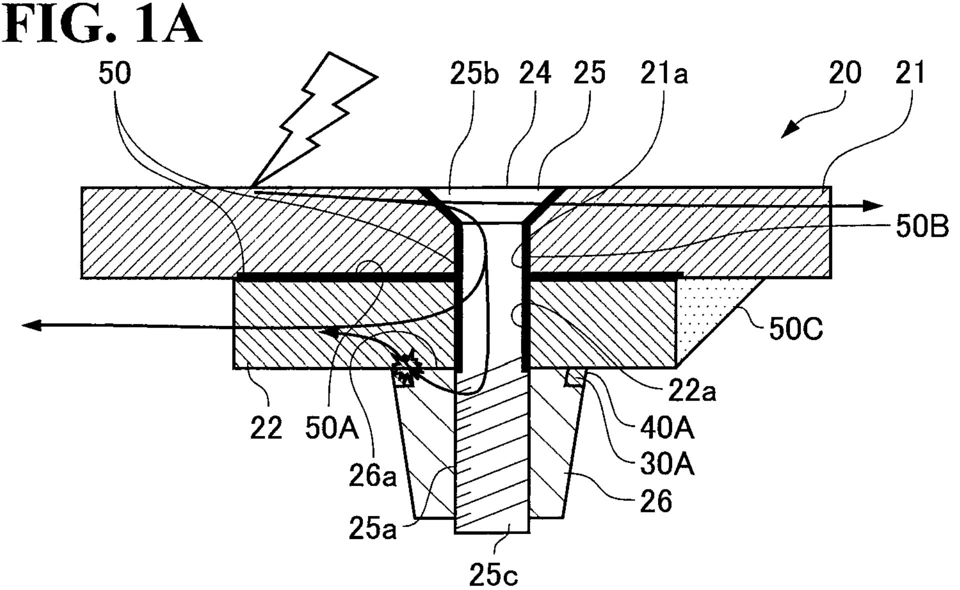
FIG. 1A is a sectional view of a fastener member and FIGS. 1B to 1H are sectional views of modification examples of a ring member, in a first embodiment.

As shown in FIG. 1A, a wing (an aircraft assembly) 20 has a shell formed of a wing panel (member) 21 made of, for example, a metal material such as aluminum alloy, CFRP (Carbon Fiber Reinforced Plastics), which is a composite material made of a carbon fiber and a resin, or GFRP (Glass Fiber Reinforced Plastics), which is a composite material made of a glass fiber and a resin. A structural member for reinforcement (such as a rib), a fuel tank and various devices provided inside the wing 20 are fixed to the wing panel 21 via a member 22 such as a stay made of a metal material such as an aluminum alloy or a composite material. The member 22 such as a stay is mounted on the wing panel 21 by a fastener member 24.

Although not shown in the drawings, when the wing panel 21 is made of a composite material, the wing panel 21 often has a metal foil, a metal mesh or the like affixed on a surface side of a portion where there is a high possibility of a direct hit by lightning. Also, whichever material, a metal or a composite material, the wing panel 21 is made of, a primer and a coating are often applied onto an outer surface of the wing panel 21 for an anti-corrosive purpose or the like. Onto other surfaces of the wing panel 21 and its inner structural members other than a portion requiring electric conductance, a primer is often applied.

The fastener member 24 includes a pin-shaped fastener body 25 and a collar (a fastening member) 26 mounted on the fastener body 25 on an inner side of the wing 20.

The fastener body 25 and the collar 26 are generally made of a metal material (for example, titanium, stainless steel, or aluminum) in view of strength.

The pin-shaped fastener body 25 has screw threads 25*a* at its tip, and has a head 25*b* at its rear end, the head 25*b* having a diameter expanded from the tip. The fastener body 25 is inserted from outside of the wing 20 into holes 21*a* and 22*a* formed as penetrating through the wing panel 21 and the member 22, and has its tip project toward the inside the wing 20, with the head 25*b* at the rear end abutting on a perimeter surface of the hole 21*a*. Surface treatment for the fastener body 25 is selected depending on the portion to be used and the working method, and a treatment for solid metal materials, an insulating coating treatment using alumina or the like, a conductive treatment using ion vapor deposition, or other such treatment can be used therefore.

The collar 26 is in the shape of a cylinder, and has an inner peripheral surface on which screw threads engaging with the screw threads 25*a* of the fastener body 25 are formed. The collar 26 is screwed into the screw threads 25*a* of the fastener body 25 projecting toward the inside of the wing 20. With this, the wing panel 21 and the member 22 are interposed between the head 25*b* of the fastener body 25 and the collar 26, thereby causing the member 22 to be fixed to the wing panel 21. Here, the collar 26 is preferably of a self-locking type capable of preventing looseness after being screwed into the fastener body 25. Also, the collar 26 may be of a torque-off type structured so that a nut-shaped head having a hexagonal shape is cut out when reaching a predetermined torque. Alternatively, it may be a removable collar of a double-hex type or the like when the collar is used for coupling in order to mount a device and is required to be attached or removed for maintenance or the like.

On the collar 26, a groove 30A is formed in an outer perimeter part of a contact surface 26*a* abutting on the member 22. In the groove 30A, a ring-shaped ring member 40A made of a resin is fitted. The ring member 40A is preferably formed of a resin, for example, PPS (poly(phenylene sulfide) resin), polyimide, PEEK (polyether ether ketone resin, and PEEK is a registered trademark of Victrex plc (Great Bretain)), nylon resin, fluororesin, epoxy resin, phenol resin, or hard rubber. Each of these resins has been confirmed to have reliability as a resin for use in an aircraft fuel tank in view of mechanical strength, oil resistance, cold resistance, heat resistance, and others.

Note that since the collar 26 is required to cooperates with the fastener body 25 to provide a predetermined fastening force, an area of the portion of the collar 26 in surface contact with the member 22 on an inner side of the groove 30A is required to be ensured as being equivalent to the conventional one.

Figure 1B:
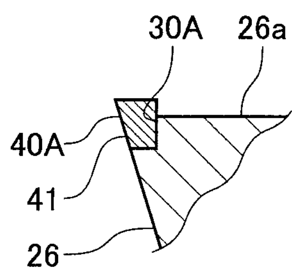

Here, as shown in FIG. 1B, the ring member 40A is formed so that the height of the ring member 40A in an axial direction of the fastener body 25 is higher than the depth of the groove 30A in the same axial direction before fastening of the fastener member 24. As such, when the collar 26 is being fastened into the fastener body 25, the ring member 40A abuts on the member 22 before the contact surface 26*a* of the collar 26 abuts on the member 22. When fastening of the collar 26 is completed, the ring member 40A is compressed and deformed. With this, the ring member 40A is reliably in intimate contact with both of the member 22 and the collar 26 by contact pressure.

Here, the height of the ring member 40A is set so that the ring member 40A comes into contact with both of the member 22 and the collar 26 with a predetermined contact pressure or more even if the ring member 40A is shrunk under an environment at low temperature occurring during a flight of the aircraft.

For an adequate resin deformation amount due to compressive deformation of the ring member 40A so that the ring member 40A comes into contact with both of the member 22 and the collar 26 with the predetermined contact pressure or more, a state in which the following three conditions hold is required to be found: (1) no one-shot destruction occurs (the stress generated in the resin when fastening the collar 26 is equal to or lower than a tensile strength), (2) a residual stress equal to or larger than 0 is present after a durable period (in general, thirty years), and (3) the compressive strain is sufficiently present at low temperature (the residual strain is equal to or more than a change in strain due to low temperature).

Figure 12:
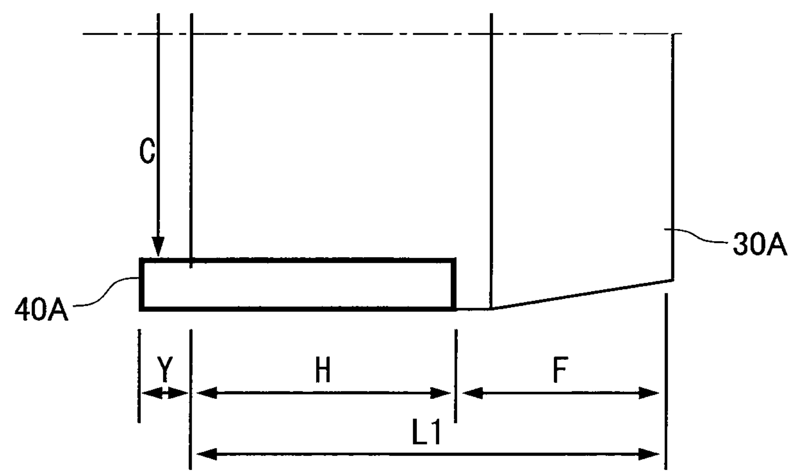
FIG. 12 is a conceptual diagram for design and study in order to set an appropriate amount of compressive deformation of the ring member.

FIG. 12 is a conceptual diagram for design and study for setting an amount of compressive deformation of the ring member 40A as appropriate. Here, the overall height of the collar 26 is denoted as L1, a projection amount of the ring member 40A from a flange surface (a resin deformation amount) is denoted as Y, and the overall length of the ring member 40A is denoted as Y+H.

Consider an example below that the ring member 40A is made of PEEK or nylon (Zytel: registered trademark) and a height F of a portion where the ring member 40A is not present in the overall height of the collar 26 is assumed to be 1/3 of the overall height L1 of the collar 26.

The consideration results are shown in Tables 1A and 1B and FIGS. 13A, 13B, 14A, and 14B.

TABLE 1A

| | | | FASTENER DIAMETERS (ONLY FOR THOSE SUPPORTING COLLAR) | | | | | | |
|---|---|---|---|---|---|---|---|---|---|
| | | | 3/16 | 1/4 | 5/16 | 3/8 | 7/16 | UNIT | REMARKS |
| SIZE | RESIN DEFORMATION AMOUNT | Y | 0.1 | 0.1 | 0.1 | 0.1 | 0.1 | mm | SET AT 0.1 mm |
| | COLLAR DIAMETER | L1 | 5.84 | 6.86 | 8.00 | 9.02 | 10.29 | mm | (HST79) |
| | | X | 2.16 | 2.29 | 2.41 | 2.41 | 2.54 | mm | (HST79) |
| | | F | 1.75 | 2.06 | 2.40 | 2.71 | 3.09 | mm | SET AT =L1 × 30% |
| | RESIN LENGTH | H | 4.09 | 4.80 | 5.80 | 6.31 | 7.20 | mm | =L1 − F |
| | COLLAR OUTER | A | 7.75 | 10.41 | 13.08 | 15.90 | 18.03 | mm | (HST79) |

TABLE 1A-continued

| | | | FASTENER DIAMETERS (ONLY FOR THOSE SUPPORTING COLLAR) | | | | | | |
|---|---|---|---|---|---|---|---|---|---|
| | | | 3/16 | 1/4 | 5/16 | 3/8 | 7/16 | UNIT | REMARKS |
| | DIAMETER | | | | | | | | |
| | COLLAR INNER DIAMETER | B | 5.03 | 6.58 | 8.18 | 9.78 | 11.35 | mm | (HST79) |
| | RESIN INNER DIAMETER | C | 6.39 | 8.50 | 10.36 | 12.84 | 14.69 | mm | SET AT =A − (A − B)50% |
| RESIN MATERIAL CHARACTERISTICS | YOUNG'S MODULUS | Ep | 3.500 | 3.500 | 3.500 | 3.500 | 3.500 | GPa | PEEK450G |
| | | Ez | 7.900 | 7.900 | 7.900 | 7.900 | 7.900 | GPa | Zytel77G33L (50% RH) |
| | TENSILE STRENGTH | $\sigma_B$_p | 97 | 97 | 97 | 97 | 97 | MPa | PEEK450G |
| | | $\sigma_B$_z | 138 | 138 | 138 | 138 | 138 | MPa | Zytel77G33L (50% RH) |
| | LINEAR EXPANSION COEFFICIENT | Kp | 47 | 47 | 47 | 47 | 47 | MPa | PEEK450G |
| | | Kz | 23 | 23 | 23 | 23 | 23 | MPa | Zytel77G33L (50% RH) |

TABLE 1B

| | | | | | | | | | |
|---|---|---|---|---|---|---|---|---|---|
| | STRESS RELAXATION | Δap | 0.01 | 0.01 | 0.01 | 0.01 | 0.01 | — | PEEK450G (REFERENCE TEMPERATURE OF 40° C.) |
| | MASTER CURVE | Δaz | 0.10 | 0.10 | 0.10 | 0.10 | 0.10 | — | Zytel77G33L (REFERENCE TEMPERATURE OF 40° C.) |
| CONDITION EVALUATION VALUES | EVALUATED LIFE | T | 262.800 | 262.800 | 262.800 | 262.800 | 262.800 | Hr | DURABILITY OF THIRTY YEARS IS ASSUMED |
| | GENERATED STRAIN | ϵ 0 | 2.39% | 2.04% | 1.75% | 1.56% | 1.37% | — | =Y/(Y + H) |
| | CHANGE IN STRAIN | ϵ p | 0.36% | 0.36% | 0.36% | 0.36% | 0.36% | MPa | PEEK450G |
| | DUE TO LOW TEMPERATURE ※ | ϵ z | 0.18% | 0.18% | 0.18% | 0.18% | 0.18% | MPa | Zytel77G33L (50% RH) |
| | GENERATED STRESS | σ0 | 84 | 71 | 61 | 55 | 48 | MPa | =E × ϵ 0 |
| | ASSUMED | σr_p | 4.3 | 3.7 | 3.1 | 2.8 | 2.5 | MPa | =Δap × log(T) |
| | STRESS RELAXATION | σr_z | 44.9 | 38.4 | 33.0 | 29.3 | 25.8 | MPa | =Δaz × log(T) |
| | RESIDUAL STRESS | Δ σp | 79.3 | 67.8 | 58.2 | 51.8 | 45.5 | MPa | =σx − σr_p |
| | | Δ σz | 38.7 | 33.1 | 28.4 | 25.3 | 22.2 | MPa | =σx − σr_z |
| | RESIDUAL STRAIN | Δ ϵ p | 2.26% | 1.94% | 1.66% | 1.48% | 1.30% | MPa | =Δ σp/E |
| | | Δ ϵ z | 0.49% | 0.42% | 0.36% | 0.32% | 0.28% | MPa | =Δ σz/E |
| EVALUATION ITEMS | ONE-SHOT | PEEK | OK | OK | OK | OK | OK | — | =if(σx < $\sigma_B$_p, "OK", "NG") |
| | DESTRUCTION | Nylon | OK | OK | OK | OK | OK | — | =if(σx < $\sigma_B$_z, "OK", "NG") |
| | COMPRESSIVE STRAIN | PEEK | OK | OK | OK | OK | OK | — | =if(Δ ϵ p > 0; "OK", "NG") |
| | | Nylon | OK | OK | OK | OK | OK | — | =if(Δ ϵ z > 1, "OK", "NG") |

Figure 13A:
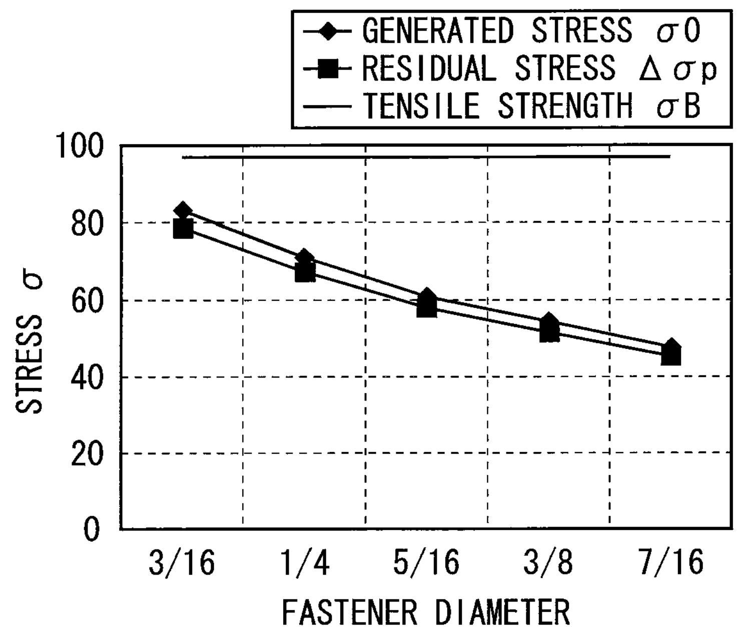
FIGS. 13A and 13B show an example in which a generated stress and a residual stress after thirty years of the ring member are calculated, FIG. 13A being in the case where the material of the ring member is PEEK and FIG. 13B being in the case where the material is nylon.
Figure 13B:
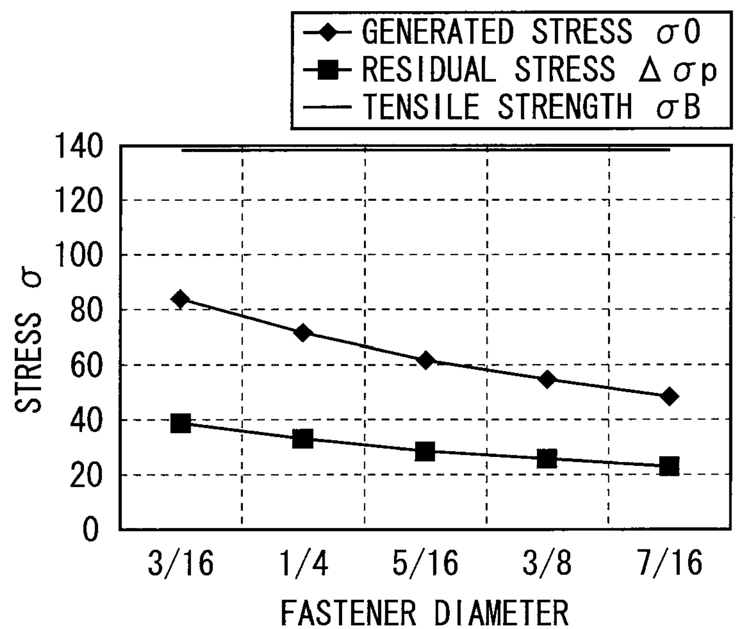

First, regarding the conditions (1) and (2) described above, an example in which calculation is performed with the resin deformation amount Y being set at 0.1 mm is shown in FIGS. 13A and 13B. FIG. 13A shows the case in which the material of the ring member 40A is PEEK, and FIG. 13B shows the case in which the material thereof is nylon.

In these cases, the stress generated in the resin at the time of fastening the collar 26 is equal to or lower than the tensile strength, and the residual stress after a durable period (in general, thirty years) is equal to or larger than 0. Therefore, it can be found that both of the conditions (1) and (2) are met and thus pose no problem. When this calculation is performed with the resin deformation amount Y being used as a parameter, it was found that the resin deformation amount Y is equal to or smaller than 0.11 mm in the case of PEEK and is equal to or smaller than 0.16 mm in the case of nylon.

Figure 14A:
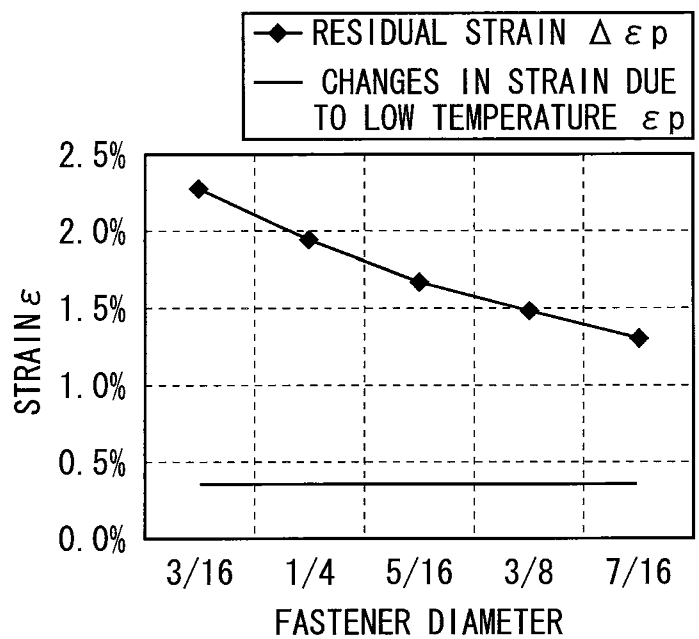
FIGS. 14A and 14B depict an example in which a residual strain of the ring member is calculated, FIG. 14A being in the case where the material of the ring member is PEEK and FIG. 14B being in the case where the material is nylon.
Figure 14B:
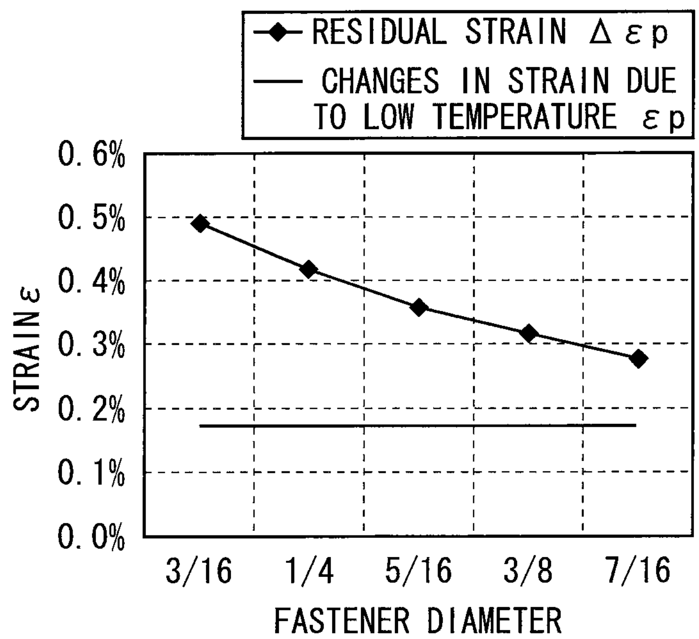

Next, regarding the condition (3) described above, an example in which calculation is performed also with the resin deformation amount Y being set at 0.1 mm is shown in FIGS. 14A and 14B. FIG. 14A shows the case in which the material of the ring member 40A is PEEK, and FIG. 14B shows the case in which the material thereof is nylon.

It can be found that this condition (c) is also met and thus poses no problem, either.

When this calculation is performed with the resin deformation amount Y being used as a parameter, it was found that the resin deformation amount Y is equal to or larger than 0.03 mm in the case of PEEK and is equal to or larger than 0.07 mm in the case of nylon.

With all these results, it was found that the ring member 40A can come into contact with both of the member 22 and the collar 26 with a predetermined contact pressure or more, if the ring member 40A is formed so that the height F is assumed to be ⅓ of L1, the resin deformation amount Y of the material is 0.03 to 0.11 in the case of PEEK and 0.07 to 0.16 in the case of nylon.

According to the structure as described above, the ring-shaped ring member 40A made of resin is fitted on the collar 26, and the ring member 40A is interposed between the member 22 and the collar 26 to be in intimate contact with both of the member 22 and the collar 26, thereby sealing the interface with the member 22 and sealing and preventing the occurrence of an arc at an outer perimeter edge (at a position where the ring member 40A is provided) of the collar 26. Since the contact surface between the groove 30A and the ring member 40A is perpendicular to the member 22, the groove 30A and the ring member 40A are easily made in intimate contact with each other at the time of compression. Although other shapes can be applied, the surfaces of the groove 30A and the ring member 40A are preferably in contact with each other in order to eliminate a position at which an arc occurs. However, even if they are separated from each other, a capability to seal the arc is present, and therefore the present invention still has an effect.

Note that there is a possibility that an arc may occur even at an interface between a tip 25*c* of the fastener body 25 and the collar 26, but it has been confirmed through a test that such a phenomenon occurs only in a special case such that a lightning current at a prescribed current value or higher is experimentally provided and the conduction state between members is extremely poor and this phenomenon hardly occurs in practice. The reason for this can be thought that a route (distribution) in which a current flowing into the fastener body 25 further flows through the member 22 is determined by a bulk resistance (a resistance per unit area of cross section or unit length) determined based on a propagation distance of the route, a contact resistance of the interface across which the route goes (a resistance per unit area of cross section), and an electromagnetic influence (the current tends to flow on a side closer to the outer surface of the tank as much as possible due to a skin effect) and, at this time, compared with a route passing near the interface between the collar 26 and the member 22 (at a position where the ring member 40A is provided), a current hardly flows through a route passing through the interface between the tip 25*c* of the fastener body 25 and the collar 26 because the route has a large propagation distance and is far away from the outer surface of the tank and, as a result, an arc is less prone to occur at that interface.

Furthermore, the ring member 40A may be manufactured in advance and simply inserted or press-fitted in the groove 30A of the collar 26, or may be integrally formed by insert molding, which is one type of injection molding, onto the machined collar 26. In either case, no ring fitting operation is required at a site for inserting the fastener member 24, and therefore work efficiency at the site can be improved and there is no variations due to workers. Compressive deformation of the ring member 40A contributing to the lightning protection (explosion prevention) capability is determined by the design as described above, and an intrinsically variable element can be eliminated. Also, overweight can be prevented.

Still further, since the ring member 40A itself does not have a complex shape, it can be mass-produced at low cost. In particular, in the case of insert molding, mass production can be made at low cost, and also the resin is molten at the time of molding to be poured into the groove 30A of the collar 26 to be self-bonded with a strong adhesion without a gap, and therefore the collar 26 and the ring member 40A become integrated in a sophisticated manner and manufactured with high accuracy without variations due to manufacturing tolerance. Still further, the ring member 40A does not come off after being manufactured.

In addition, even in an temperature-changing environment at, for example, −60° C. to +80° C., the ring member 40A can stably prevent and seal the occurrence of an arc.

Still further, it is easy to visually inspect the fitted state, the deterioration state, and others of the ring member 40A and thus management and maintenance operations can be easily and reliably performed.

For these reasons, the lightning protection (explosion prevention) fastener can achieve sufficient lightning protection capability, ensure reliability, and guarantee the quality at low cost and with a light weight in response to requirements of reliability to prevent failures in lightning protection (explosion prevention) measures of an aircraft fastener required in current aviation regulations regarding prevention of fuel-tank explosion, wherein the requirements include: a prevention of failures due to errors in manufacturing, mounting, and inspection; a prevention of a decrease in capabilities due to variations in manufacture; and a prevention of deterioration in performance and others in an operating environment with an aircraft life of over thirty years.

A method of manufacturing an aircraft assembly by using a lightning protection fastener of the present embodiment is described below.

First, the wing panel 21 and the member 22 each machined in advance into a predetermined shape and having its surface subjected to a predetermined primer, coating or conductive treatment are positioned with a pilot hole and a pin, which are not shown, and then are superposed each other so as to be placed in contact with each other.

Then, with both fixed by a cramp not shown, a drill is used from outside the wing panel 21 to make a hole 21*a* and hole 22*a* penetrating through the wing panel 21 and the member 22, respectively. As required, holes for other fasteners are made with a similar operation. Here, manufacturing is performed with attention so that the bore diameter and perpendicularity are within accurate tolerances based on the specifications of Interference Fit, Transition Fit, Clearance Fit, and others and the surface is smooth. Also, as required from an aspect of aerodynamics and others, countersinking is performed.

After manufacturing, the bore diameter, perpendicularity, smoothness, and others are inspected as required.

When all of the works of making holes for mounting the member 22 and the inspection are completed, the cramp is removed to separate the wing panel 21 and the member 22 from each other. Then, in each of the wing panel 21 and the member 22, the hole 21*a* and the hole 22*a* are deburred, and chippings, cutting oil and other attached on the surfaces are removed for cleaning.

Next, an appropriate amount of a sealant 50 is applied onto a contact surface of the wing panel 21 or the member 22, and then the wing panel 21 and the member 22 are positioned with a pilot hole and a pin, which are not shown, and then are placed in contact with each other while the applied sealant 50 is being squeezed out to surroundings of the contact surface.

Then, an appropriate amount of a sealant 50B is applied to an shaft portion of the fastener body 25, and the fastener body 25 is inserted into the hole 21*a* from outside the panel 21 to penetrate through the hole 22*a* of the member 22 to be at a predetermined position. Here, since the fastener body 25 is normally very difficult to insert, a rubber hammer or the like is used as appropriate for insertion. Also, since an excess of the sealant 50B is squeezed out from the hole to outside, the sealant attached to the surroundings of the hole or the screw threads 25*a* is wiped off.

Next, the collar 26 having the ring member 40A fitted in advance in the groove 30A is prepared. The collar 26 is mounted on the screw threads 25*a* of the fastener body 25, and is then fastened with a predetermined torque. Furthermore, a portion of the sealant 50B extending to the surroundings of the collar 26 is wiped off.

When mounting other fasteners with a similar manner is completed, a sealant 50C is applied to an end of the member 22, thereby completing assembling.

The process described above is required to end before the sealants become stiff.

With this manufacturing method, a collar having attached thereto a resin ring fabricated in advance with high accuracy can be used. Thus, there is no need to perform conventionally-required manual works of applying a resin sealant and others, and a reduction in lightning protection and explosion prevention capabilities due to variations in manufacture can be totally eliminated.

Figure 1C:
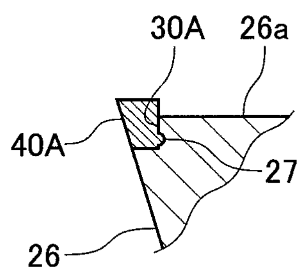
Figure 1D:
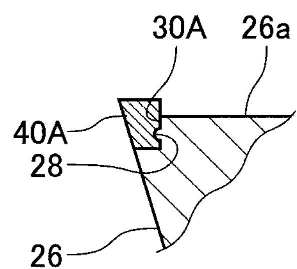

Note that, as shown in FIGS. 1C and 1D, a projection 27 or a concave groove 28 projecting in a diameter direction may be provided to the ring member 40A as a stopper for preventing the ring member 40A from coming off from the groove 30A in an axial direction.

Figure 1E:
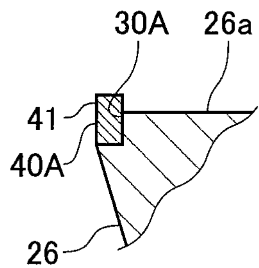

Also, an outer perimeter surface 41 of the ring member 40A may be tapered as shown in FIG. 1A, may be perpendicular to the contact surface 26*a* of the collar 26 as shown in FIG. 1E, or may have another shape.

Figure 1F:
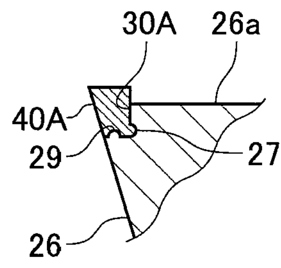

Furthermore, as shown in FIG. 1F, a projection 29 projecting from the outer perimeter part of the groove 30A in an axial direction is provided to the ring member 40A as a stopper for preventing the ring member 40A from coming off to an outer perimeter side.

Figure 1G:
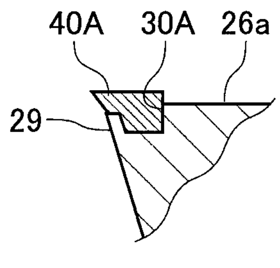
Figure 1H:
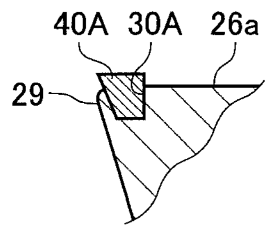

Still further, as shown in FIGS. 1G and 1H, the projection 29 may be formed so as to surround the outer perimeter of the ring member 40A. Here, the tip of the projection 29 is formed lower than a position flush with the contact surface 26*a* of the collar 26 so as not to be in contact with the member 22. The tip of the projection 29 may form an acute angle as shown in FIG. 1G, or may be thick as shown in FIG. 1H. With an acute angle, the weight of the collar can be reduced. On the other hand, if the tip is thick, electric-field concentration can be avoided. Thus, it is possible to increase a threshold of a current in case of a large current of a lightning stroke flowing through the collar 26, leading to the occurrence of a spark due to electric-field concentration between the tip of the projection 29 and the member 22 to ignite the fuel. Therefore, the projection 29 can be used at a portion where a large current may possibly flow.

In addition, the collar 26 is often pressed and crushed (swaged) from a plurality of outer perimeter points to be in a polygonal shape so as not to come off from the fastener body 25. In the case of the collar 26, in order to sufficiently provide an arc sealing effect, the ring member 40A and the groove 30A are required to be attached without a gap. Also, in view of manufacture, it is preferable for the ring member 40A and the groove 30A each to have a circular shape for processing and mounting purposes. Therefore, preferably, by swaging the collar 26 at a half portion thereof on an opposite side away from the ring member 40A and the groove 30A, the ring member 40A and the groove 30A are prevented from being crushed into a polygonal shape to keep the circular shape. Alternatively, by swaging the collar 26 and then fusion-welding (melting and mounting) the ring member 40A by insert molding, fusion welding can be achieved without a gap even if the groove 30A is crushed into a polygonal shape.

Note that in the present embodiment described above, the sealants 50A and 50B are applied to the interface between the wing panel 21 and the member 22 and the interface between the fastener body 25 and the wing panel 21 and the member 22, respectively. Also, the sealant 50C is applied to the boundary portion between the wing panel 21 and the end of the member 22. However, this is to prevent fuel leakage or water infiltration for preventing corrosion. These sealants are very thin, and have no action of inhibiting electrical conduction. As for arc protection, the ring member 40A fitted onto the collar 26 has that function. Also, the fastener body 25 and the collar 26 is normally made of metal, but may be subjected to any of various non-conductive and conductive treatments as described above as a surface treatment. Furthermore, the relation in diameter between the fastener body 25 and the holes 21*a* and 22*a* may be in any fastening state, such as Interference Fit, Transition Fit, or Clearance Fit.

Still further, while the wing panel is taken as an example of a first member in the present embodiment, the present invention can be applied to an inner structural member or others. The head of the fastener body 25 for use may have any of various shapes, such as a dish shape, a pot shape, and a nut shape.

Next, a modification example of the first embodiment described above is shown. In each of the following embodiments shown below, the structures of the ring member and the groove are different from those of the first embodiment described above, and other structures are common to those of the first embodiment described above. Therefore, in the following, description is made mainly on the structures different from those of the first embodiment described above, and the common structures are provided with the same reference numerals and their description is omitted.

Second Embodiment

Figure 2A:
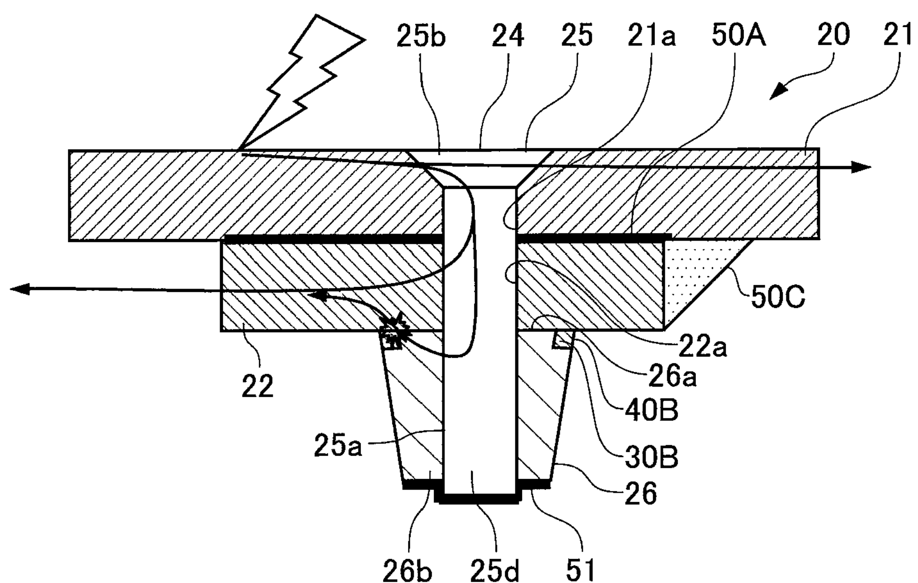
FIG. 2A is a sectional view of a fastener member.

As shown in FIG. 2A, a ring member 40B in the present embodiment is fitted in a groove 30B formed on the outer perimeter part of the collar 26.

Figure 2B:
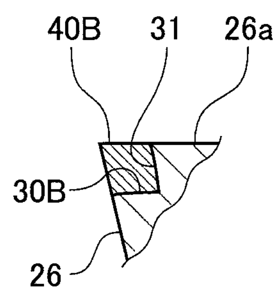
FIG. 2B is an enlarged sectional view of a ring member.

Here, as shown in FIG. 2B, the groove 30B is formed to be tapered so that an inner diameter of an inner perimeter wall surface 31 of the groove 30B is gradually reduced as going from a contact surface 26*a* side of the collar 26 toward its opposite side.

The ring member 40B also has a sectional shape formed so as to fit in this groove 30B.

According to the structure as described above, the ring member 40B is in intimate contact with both of the member 22 and the collar 26 to seal the interface with the member 22, thereby preventing and sealing the occurrence of an arc at an outer perimeter edge part of the collar 26.

Furthermore, since the inner perimeter wall surface 31 of the groove 30B is tapered, the ring member 40B is less prone to come off from the collar 26. Thus, it is possible to prevent a situation such that the ring member 40B inadvertently falls off at the time of mounting the collar 26 or storage and transportation before mounting to negate an effect of preventing and sealing the occurrence of an arc, thereby reliably achieving a lightning protection capability.

Figure 2C:
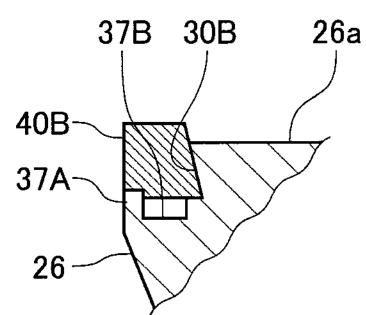
FIGS. 2C and 2D are sectional views of modification examples of the ring member, in a second embodiment.

As shown in FIG. 2C, when the groove 30B is formed to be tapered so that the inner diameter of the inner perimeter wall surface 31 of the groove 30B is gradually reduced as going from the contact surface 26*a* side of the collar 26 toward its opposite side, a stopper for preventing the ring member 40B from coming off to an outer perimeter side is preferably formed. In this case, a projection 37A projecting in an axial direction of the collar 26 can be formed on the outer perimeter portion of the groove 30B, and also a concave groove 37B can be formed on its inner perimeter side. The ring member 40B includes a step part 43 engaged with the projection 37A, and has a shape not entering the concave groove 37B in an initial state.

Figure 2D:
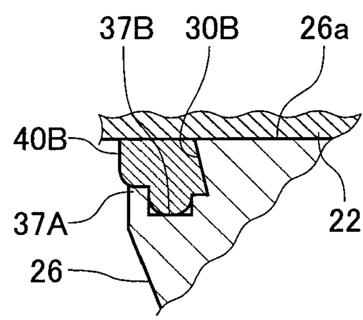

As shown in FIG. 2D, when the fastener member 24 and the collar 26 are fastened to press the tip of the ring member 40B onto the member 22, the ring member 40B is crushed and partially enter the concave groove 37B.

Thus, with the projection 37A and the concave groove 37B, the ring member 40B can be prevented from coming off to the outer perimeter side.

Third Embodiment

Figure 3A:
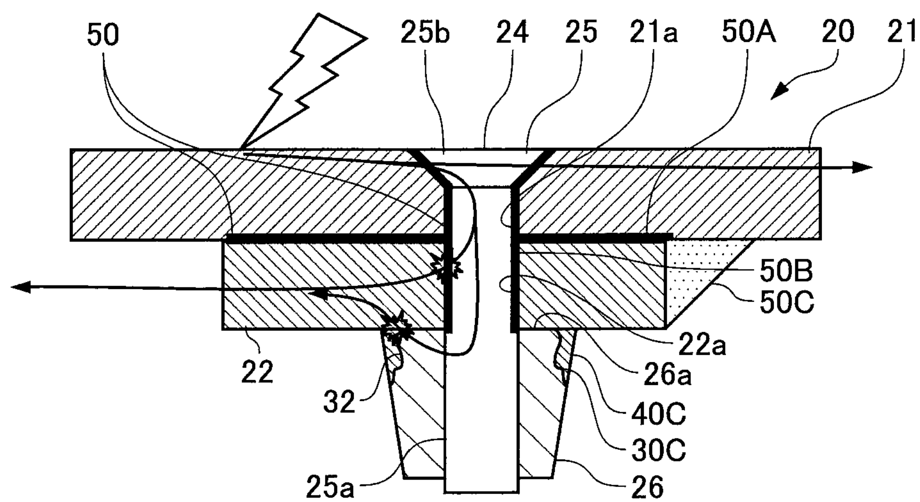
FIG. 3A is a sectional view of a fastener member and FIG. 3B is an enlarged sectional view of a ring member, in a third embodiment.
Figure 3B:
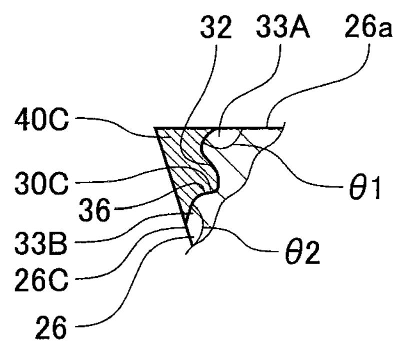

As shown in FIGS. 3A and 3B, a groove 30C in which a ring member 40C is fitted in the present embodiment has a tapered surface 32 formed in a tapered shape so that its inner diameter is gradually reduced as going from the contact surface 26*a* side of the collar 26 toward its opposite side. Furthermore, edge parts 33A and 33B adjacent to an inner perimeter surface of the groove 30C and the contact surface 26*a* and an outer perimeter surface 26*c* of the collar 26 are formed so as to have obtuse angles θ1 and θ2, respectively. Also, the groove 30C has a pushing surface 36 formed nearly parallel to the contact surface 26*a* of the collar 26 to push the ring member 40C onto the member 22.

The ring member 40C has a sectional shape formed so as to fit in the groove 30C.

According to the structure as described above, the ring member 40C is in intimate contact with both of the member 22 and the collar 26 to seal the interface with the member 22, thereby preventing and sealing the occurrence of an arc at an outer perimeter edge part of the collar 26.

Furthermore, since the tapered surface 32 is formed in the groove 30C, the ring member 40C is less prone to come off from the collar 26. Thus, it is possible to prevent a situation such that the ring member 40C inadvertently falls off at the time of mounting the collar 26 to negate an effect of preventing and sealing the occurrence of an arc, thereby reliably achieving a lightning protection capability.

Still further, since the edge parts 33A and 33B of the outer perimeter part of the collar 26 each have an obtuse angle, concentration of currents on these parts can be prevented, and the effect of preventing and sealing the occurrence of an arc can be more ensured. Also, for the same reason, a stress does not concentrate on a contact portion between the edge parts 33A and 33B of the ring member 40C, the occurrence of a damage such as a crack in resin by an external force can be suppressed.

Fourth Embodiment

Figure 4A:
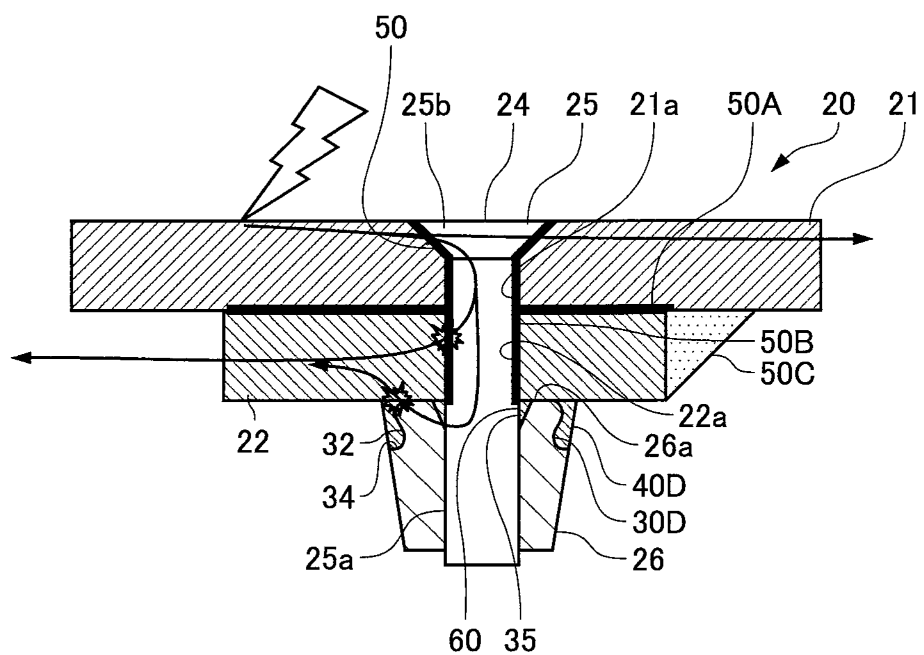
FIG. 4A is a sectional view of a fastener member and FIG. 4B is an enlarged sectional view of a ring member, in a fourth embodiment.
Figure 4B:
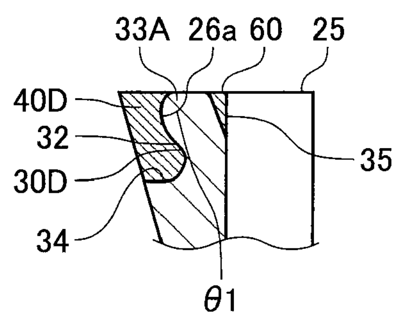

As shown in FIGS. 4A and 4B, a groove 30D in which a ring member 40D is fitted in the present embodiment has a tapered surface 32 formed in a tapered shape so that its inner diameter is gradually reduced as going from the contact surface 26*a* side of the collar 26 toward its opposite side. Furthermore, the edge part 33A adjacent to an inner perimeter surface of the groove 30D and the contact surface 26*a* of the collar 26 is formed so as to have an obtuse angle θ1.

Meanwhile, in the groove 30D, a parallel part (a parallel surface) 34 parallel to the contact surface 26*a* of the collar 26 on a side away from the contact surface 26*a* is formed.

The ring member 40D has a sectional shape formed so as to fit in the groove 30D.

Also, in the contact surface 26*a* of the collar 26, a groove 35 may be formed also near the interface with the fastener body 25 on an inner perimeter side, and the groove 35 may be provided with an insulating ring member (a second ring member) 60.

According to the structure as described above, the ring member 40D is in intimate contact with both of the member 22 and the collar 26 to seal the interface with the member 22, thereby preventing and sealing the occurrence of an arc at an outer perimeter edge part of the collar 26.

Furthermore, since the tapered surface 32 is formed in the groove 30D, the ring member 40D is less prone to come off from the collar 26. Therefore, it is possible to prevent a situation such that the ring member 40D inadvertently falls off at the time of mounting the collar 26 to negate an effect of preventing and sealing the occurrence of an arc, thereby reliably achieving a lightning protection capability.

Also, since a flat part 34 is formed in the groove 30D, the ring member 40D can be reliably interposed between the flat part 34 and the surface of the member 22 for compression. With this, the occurrence of an arc can be more reliably prevented and sealed. In particular, when the member 22 is made of a composite material, an abutting surface with the contact surface 26*a* of the collar 26 may be a surface without being machined. In such case, the ring member 40D can be reliably pushed onto the member 22, thereby reliably sealing an arc.

Still further, since the contact surface 26*a* of the collar 26 is provided also with a ring member 60 near the interface with the fastener body 25 on an inner perimeter side, it is possible to prevent and seal the occurrence of an arc at the interface between the collar 26 and the fastener body 25 and the interface with the member 22.

The structure as described above is particularly effective when the fastener body 25 is made of a metal material, the wing panel 21 and the member 22 are each made of a composite material, and an arc tends to occur at an interface between the fastener body 25, and the wing panel 21 and the member 22.

In this case, since the ring member 60 functions as a seal material for preventing fuel leakage, as shown in FIG. 4A, the sealant 50 of the fastener body 25 may be applied to the head 25*b* of the fastener body 25 and this is taken as a sealing material for preventing fuel leakage, with the head 25*b* standing on a surface surrounding the hole 21*a*.

Note that while the structure is such that the sealants 50A, 50B, and 50C are applied to the interface between the fastener body 25 and the wing panel 21 and the member 22 for preventing fuel leakage in the first to fourth embodiments described above, the structure is not meant to be restricted to this.

For example, as shown in FIG. 2A, among interfaces between the fastener body 25 and the wing panel 21 and the member 22, no sealant may be applied to the interface between the fastener body 25 and the wing panel 21, the sealant 50A may be applied only to the interface between the wing panel 21 and the member 22, and the sealant 51 may be lightly applied by a brush or the like to a top surface 26*b* of the collar 26 and a tip surface 25*d* of the fastener body 25 for preventing fuel leakage.

Also, when the fastener body 25 is made of a metal material and the wing panel 21 and the member 22 are made of a CFRP material, there is a possibility that an arc may strongly occur at an interface between the fastener body 25, and the wing panel 21 and the member 22. To prevent and seal this occurrence, as shown in FIG. 1A to 3B, the sealant 50 is applied desirably by wet installing, thereby preventing the occurrence of electricity at that portion.

Figure 5A:
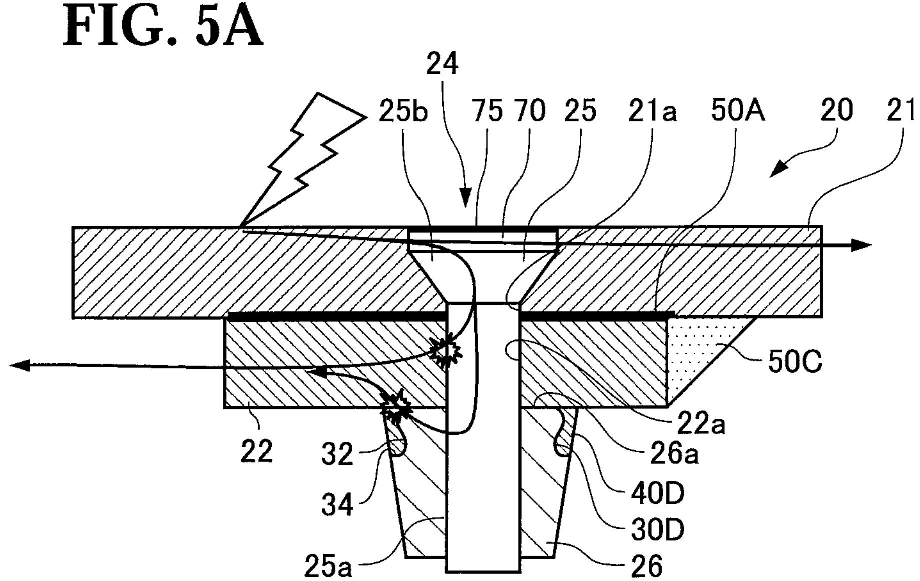
FIG. 5A is a sectional view of the fastener member having a head provided with a cap.
Figure 5B:
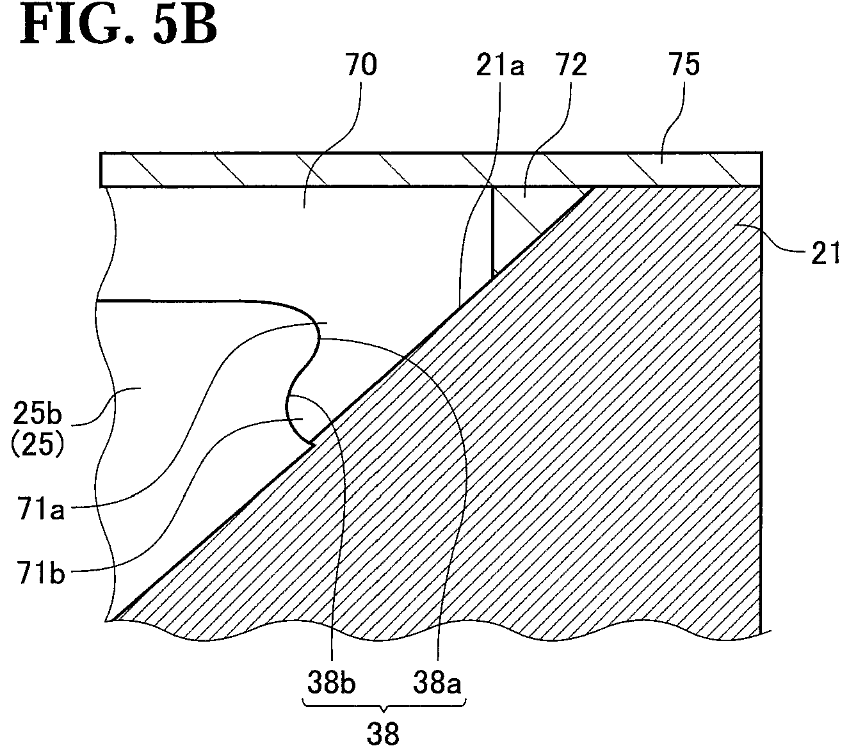
FIG. 5B is an enlarged sectional view of the cap.

Furthermore, while the sealant 50 or the sealant 51 are used as sealing materials for preventing fuel leakage, as shown in FIGS. 5A and 5B, a cap 70 made of an insulating material may be mounted on the head 25*b* of the fastener body 25 in place of the sealants. Here, the head 25*b* of the fastener body 25 is positioned on a dry side (outside the fuel tank) with respect to the wing panel 21, a fastening force (a pushing force) is provided from the countersink surface 25*d*.

On an outer perimeter part of the head 25*b* of the fastener body 25, a cap engaging part 38 is formed. The cap engaging part 38 includes a convex part 38*a* projecting (diameter-expanding) along a circumferential direction to the outside in a diameter direction and a concave part 38*b* formed continuously with the convex part 38*a* and bowed inward (recessed) along a circumferential direction to the inside in the diameter direction. Each of these convex part 38*a* and the concave part 38*b* is formed so that its sectional shape is rounded. As such, with the convex part 38*a* and the concave part 38*b* being rounded, it is possible to suppress a phenomenon in which a streamer occurs due to concentration of electric fields to invite lightning to that portion. Also, since concentration of stresses can also be suppressed, a damage by an external force can be prevented during operation of the aircraft, thereby achieving high reliability and long life.

The cap 70 is formed by using a thermoplastic resin (for example, polyether-imide (PEI), which has high heat resistance and strength and also has a high breakdown voltage, polyether ether ketone (PEEK), which is excellent in heat resistance and strength and also is excellent in moldability and versatility, poly(phenylene sulfide) (PPS), which has high heat resistance and strength and also is excellent in moldability and versatility, and polyamide-imide (PAI), which is particularly excellent in heat resistance and strength), or a thermosetting resin (for example, polyimide (PI), which is particularly excellent in heat resistance and strength), or others.

To engage with the cap engaging part 38, the cap 70 has formed on an inner perimeter side a concave part 71*a* and a convex part 71*b*. The concave part 71*a* is bowed inward (recessed) along the circumferential direction to the outside in the diameter direction and matches the convex part 38*a* of the cap engaging part 38. The convex part 71*b* projects along the circumferential direction to the inside in the diameter direction and matches the concave part 38*b* of the cap engaging part 38.

The cap 70 can be integrally molded at the head 25*b* of the fastener body 25 by injection molding. Here, with the concave part 71*a* and the convex part 71*b* being engaged with the cap engaging part 38, the cap 70 is integrally formed with the fastener body 25.

By providing the cap 70 as described above, the space between the fastener body 25 and the wing panel 21 is sealed, thereby preventing fuel leakage.

Note that a coat 75 is formed by coating on the surfaces of the cap 70 and the wing panel 21.

Also, a space between an outer perimeter of the cap 70 and the wing panel 21 is filled with a sealant 72, thereby making an aerodynamic plane smooth and preventing a crack in the coat 75.

Fifth Embodiment

In the first to fourth embodiments, an example is shown in which a head side of the fastener is outside a portion having a possibility of being filled with flammable fuel vapor (outside the fuel tank). In the present embodiment, an example is shown in which the head side is inside the portion having a possibility of being filled with flammable fuel vapor.

Figure 6:
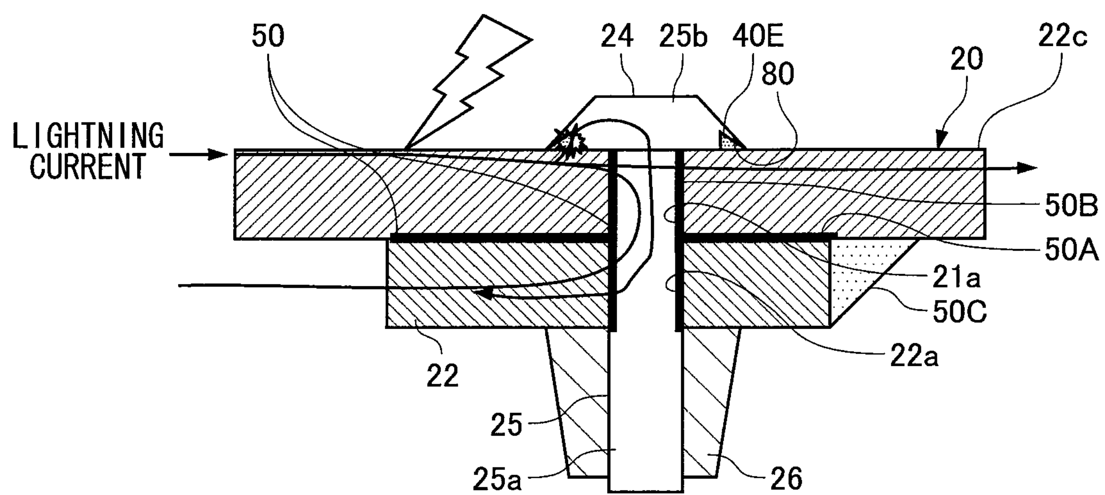
FIG. 6 is a sectional view of a fastener member in a fifth embodiment.

As shown in FIG. 6, a ring member 40E in the present embodiment is provided not to the collar 26 but to the head 25*b* of the fastener body 25.

That is, a groove 80 having a sectional shape similar to that of the groove 30A of the first embodiment is formed on the head 25*b* of the fastener body 25. In the groove 80, the ring member 40E having a sectional shape similar to that of the ring member 40A in the first embodiment is fitted.

According to the structure as described above, it is possible to prevent and seal the occurrence of an arc at an interface between the head 25*b* of the fastener body 25 and a fastened member (a member) 22*c*. Examples of the fastened member 22*c* include a main wing rib and a spar.

Figure 7:
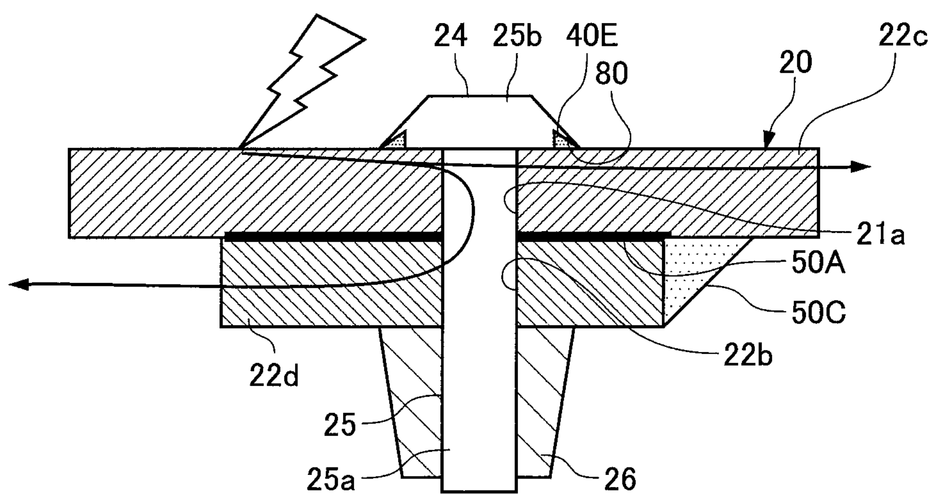
FIG. 7 is a sectional view of a modification example of FIG. 6.

Also, according to the structure as described above, a sealing capability against infiltration of water from the head side for preventing corrosion can be achieved by the ring member 40E. Therefore, as shown in FIG. 7, the structure can be such that application of the sealant 50 to the interface between the fastener body 25 and the fastened member 22*c* or a member 22*d* can be omitted from the structure shown in FIG. 6. As a result of this, the structure can be made more easily, at lower cost, and with lighter weight.

Note that when both sides of the fastened member are portions having a possibility of being filled with flammable fuel vapor, the structure shown in the present embodiment can be combined with the structure on a collar side shown in the first to fourth embodiments described above.

Sixth Embodiment

Figure 8A:
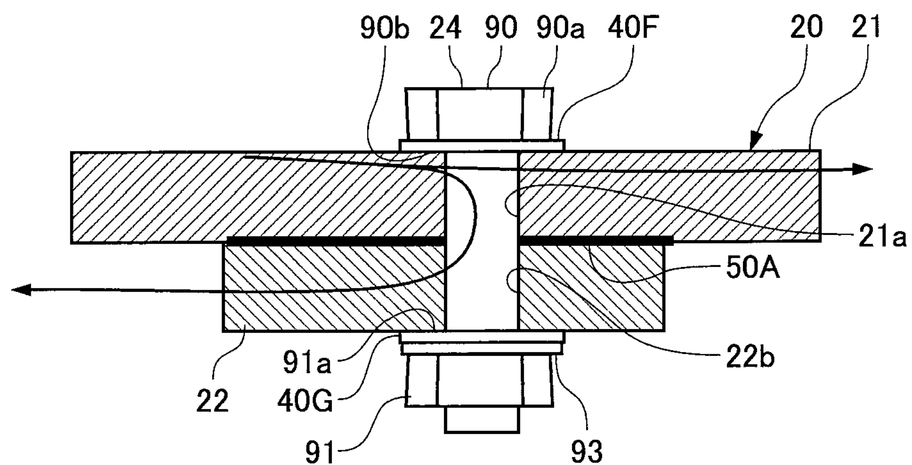
FIG. 8A is a sectional view of a fastener member in a sixth embodiment.

As shown in FIG. 8A, in the structure of the present embodiment, as the fastener member 24, a bolt (a fastener body) 90 is used in place of the fastener body 25 and a nut (a fastening member) 91 is used in place of the collar 26, thereby fastening the wing panel 21 and the member 22. In the present embodiment, both of the fastened member 22*c* and the member 22*d* are examples of portions having a possibility of being filled with flammable fuel vapor.

Figure 8B:
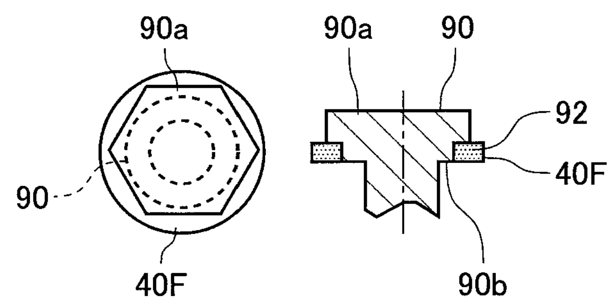
FIG. 8B shows a plan view and a sectional view of a head of a bolt.

Here, as shown in FIG. 8B, a groove 92 is formed on an outer perimeter part of a flange surface 90*b* of a head 90*a* of the bolt 90, and a washer-type ring member 40F is fitted in the groove 92. The ring member 40F is interposed between the surface of the wing panel 21 and the head 90*a* of the bolt 90, thereby sealing an arc at an interface between the surface of the wing panel 21 and the head 90*a* of the bolt 90 and sealing against fuel leakage.

Figure 8C:
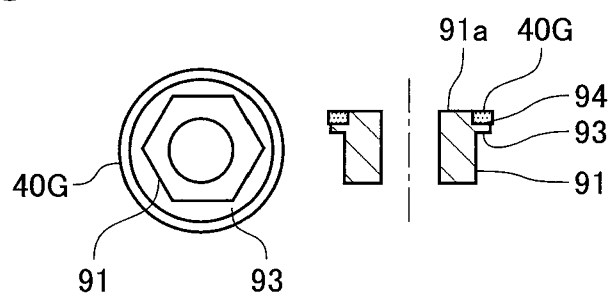
FIG. 8C shows a plan view and a sectional view of a nut.

Also, as shown in FIG. 8C, in the nut 91, a flange part 93 extending to an outer perimeter side is formed on a contact surface 91*a* with the member 22. A groove 94 is formed on an outer perimeter part of the flange part 93, and a washer-type ring member 40G is fitted in the groove 94.

The ring member 40G is interposed between the flange part 93 and the member 22, thereby preventing and sealing the occurrence of an arc at an interface between the nut 91 and the member 22 and sealing against fuel leakage.

Note that since the flange part 93 is provided to the nut 91, a larger area of the ring member 40G can be pressed, thereby particularly improving an effect of preventing and sealing the occurrence of an arc.

According to the structure as described above, even when the bolt 90 and the nut 91 are used as the fastening member 24, the effect of preventing and sealing the occurrence of an arc and the effect of preventing fuel leakage can be reliably achieved.

Therefore, even when equipment of various types including a fuel tank provided to an inner space of the wing 20 is removably mounted on the member 22 such as a stay, the fastener member 24 formed of the bolt 90 and the nut 91 is applied to achieve the effects described above.

Figure 9:
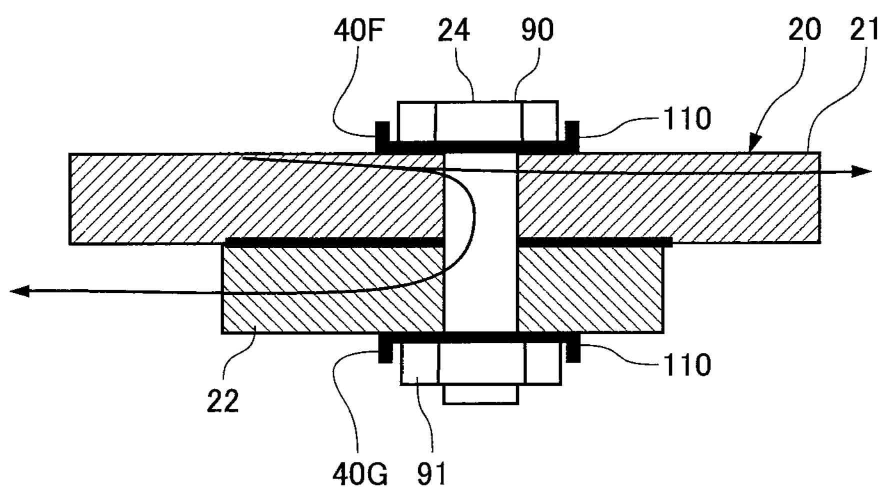
FIG. 9 is a view of a modification example of a ring member.
Figure 10A:
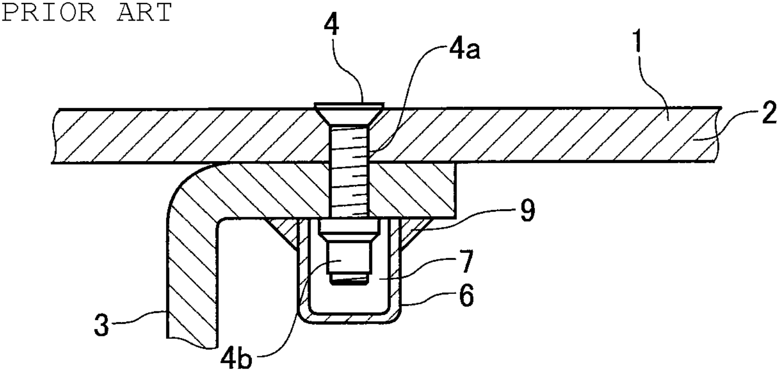
FIGS. 10A and 10B are sectional views of a plurality of examples of a conventional fastener member.
Figure 10B:
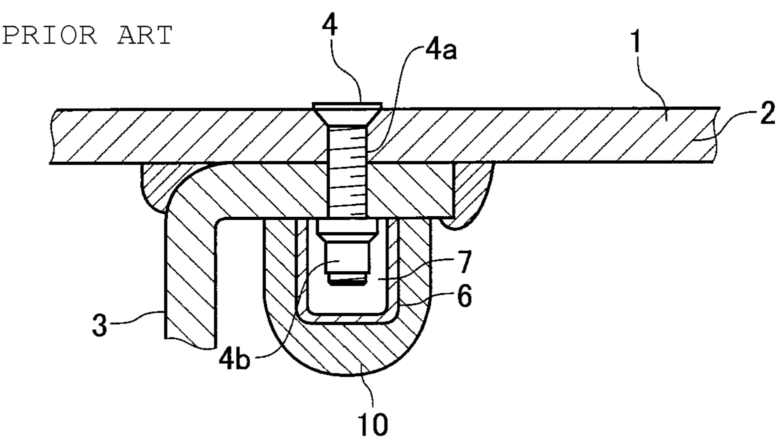
Figure 11:
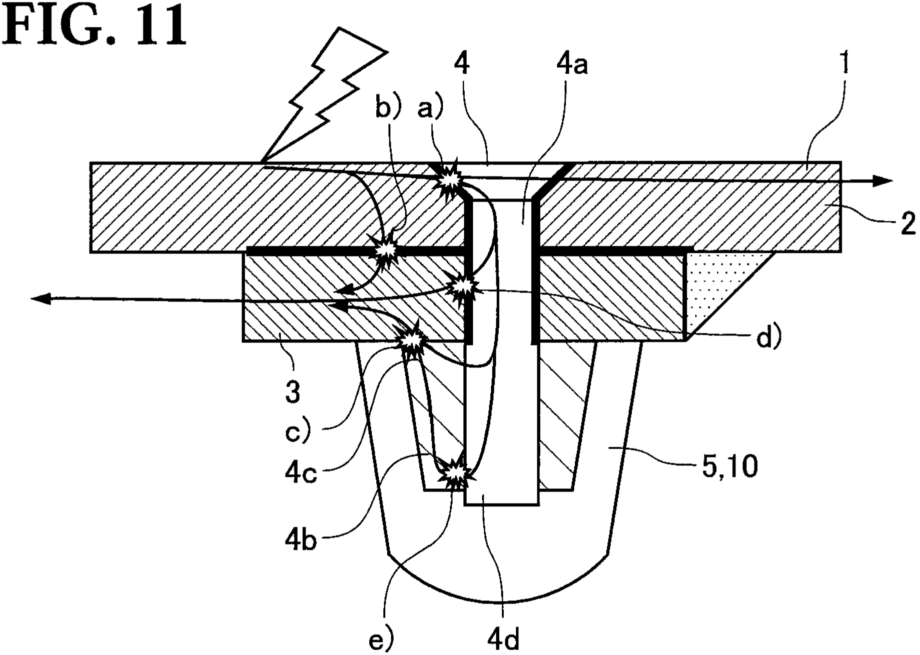
FIG. 11 is a sectional view indicating a position where an arc occurs in the conventional fastener member.

Meanwhile, in each of the embodiments described above, as shown in FIG. 9, the ring members 40F and 40G may extend to the outer perimeter side from the bolt 90 and the nut 91. In this case, an outer perimeter wall part 110 surrounding the outer perimeter side of the bolt 90 and the nut 91 may be provided. This structure may be similarly applied to the ring members 40A to 40E.

Also, while the lightning protection fastener for use in the wing 20 is mainly described above, the present invention can be applied to a lightning protection fastener to prevent explosion for use in another portion, such as a fuselage of an aircraft, to achieve similar effects.

Other than the above, the structures cited in the embodiments described above can be selected or omitted, or can be changed to other structures as appropriate without departing from the gist of the present invention.

What is claimed is:

1. A lightning protection fastener comprising:

a fastener body provided in order to fasten at least two of members configuring an airframe of an aircraft, the fastener body penetrating through holes formed in all of the members;

a fastening member mounted on a portion of the fastener body projecting from the members in order to fasten the members together; and a ring member made of an insulating material, the ring member being interposed in a compressed state between at least one of an outside diameter of a head of the fastener body and an outside diameter of the fastening member, and the members, wherein the ring member is fitted in a groove formed on the outside diameter of the head of the fastener body or on the outside diameter of the fastening member.

2. The lightning protection fastener according to claim 1, wherein the groove has a tapered surface with a diameter gradually reduced as being away from the members.

3. The lightning protection fastener according to claim 2, wherein the groove has a parallel surface parallel to the surfaces of the members, and the ring member is interposed between the parallel surface and the surfaces of the members.

4. The lightning protection fastener according to claim 1, wherein an edge part adjacent to an inner perimeter surface of the groove and an outer surface of the fastener body or the fastening member is formed to have an obtuse angle.

5. The lightning protection fastener according to claim 1, wherein at least one of the ring member and the groove includes means preventing the ring member from being detached from the groove.

6. The lightning protection fastener according to claim 1, further comprising a second ring member made of an insulating material, the second ring member being interposed in a compressed state between an inner perimeter part of the fastening member and the members.

7. The lightning protection fastener according to claim 1, wherein when one of the two members is a fuel tank, a sealing material for preventing fuel from leaking from the one member to the other member is applied onto at least one of an interface between the two members, an interface between the fastener body and the two members, and a portion between a tip of the fastener body and the fastening member.

8. An aircraft assembly, wherein at least two of members configuring an airframe of an aircraft are fastened by the lightning protection fastener according to claim 1.

9. A method of manufacturing an aircraft assembly requiring an explosion prevention measure by using the lightning protection fastener according to claim 1, comprising the steps of:

placing at least two members as superposed;

forming a fastener hole in the superposed at least two members so that the fastener hole penetrate therethrough;

applying a sealant onto a contact surface between the two members, and placing again the at least two members as superposed while squeezing out the applied sealant to surroundings of the contact surface;

inserting the fastener body into the fastener holes of the at least two members so that the fastener body penetrates therethrough; and mounting and fastening a collar onto the fastener body, the collar having a ring made of an insulating material fitted in advance in a groove provided at an outside diameter of a contact surface with the members.

10. The lightning protection fastener according to claim 1, wherein the ring member is insert-molded onto the fastener body or the fastening member such that the ring member is integrally formed with the fastener body or the fastening member.

* * * * *

UNITED STATES PATENT AND TRADEMARK OFFICE

CERTIFICATE OF CORRECTION

PATENT NO. : 8,587,916 B2
APPLICATION NO. : 13/420008
DATED : November 19, 2013
INVENTOR(S) : Hideo Yamakoshi et al.

It is certified that error appears in the above-identified patent and that said Letters Patent is hereby corrected as shown below:

In the Specification

In Col. 9, Line 15 at Resin Length in Table 1A, delete “5.80” and insert -- 5.60 --.

Column 20, line 12, delete “of”.

Signed and Sealed this
Seventeenth Day of June, 2014

Michelle K. Lee
*Deputy Director of the United States Patent and Trademark Office*